United States Patent [19]
Dillon

[11] Patent Number: 6,067,561
[45] Date of Patent: *May 23, 2000

[54] ELECTRONIC MAIL NOTIFICATION SYSTEM AND METHOD WITHIN A HYBRID NETWORK THAT TRANSMITS NOTIFICATIONS VIA A CONTINUOUS, HIGH-SPEED CHANNEL

[75] Inventor: Douglas Dillon, Gaithersburg, Md.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/797,506

[22] Filed: Feb. 7, 1997

[51] Int. Cl.$^7$ .............................. G06F 13/00; H04Q 7/00
[52] U.S. Cl. .................. 709/206; 709/201; 709/202; 709/203; 709/204; 709/205; 709/207; 379/88; 379/93.01; 379/93.17; 379/93.24; 379/100.08
[58] Field of Search .................................. 709/203, 204, 709/205, 206, 201, 207, 217, 239, 202; 379/88, 93.01, 90.01, 93.17, 93.24, 100.08; 358/402; 375/222; 455/412; 395/200.34, 200.35, 200.36, 200.37

[56] References Cited

U.S. PATENT DOCUMENTS

| | | | |
|---|---|---|---|
| 5,487,100 | 1/1996 | Kane | 709/206 |
| 5,548,814 | 8/1996 | Lorang et al. | 455/38.1 |
| 5,608,606 | 3/1997 | Blaney | 361/686 |
| 5,648,990 | 7/1997 | Kraul et al. | 375/316 |
| 5,689,642 | 4/1998 | Harkins et al. | 709/206 |
| 5,706,211 | 1/1998 | Beletic et al. | 709/206 |
| 5,742,905 | 4/1998 | Pepe et al. | 455/461 |
| 5,751,791 | 5/1998 | Chen et al. | 379/88.13 |
| 5,758,088 | 5/1998 | Bezaire et al. | 709/232 |
| 5,781,857 | 7/1998 | Hwang et al. | 455/412 |
| 5,862,325 | 1/1999 | Reed et al. | 709/201 |
| 5,978,837 | 11/1999 | Foladare et al. | 709/207 |

OTHER PUBLICATIONS

Mark R. Brown, Special Edition Using Netscape 2, Que, 1995.

*Primary Examiner*—Frank J. Asta
*Assistant Examiner*—William C. Vaughn, Jr.
*Attorney, Agent, or Firm*—John T. Whelan; Michael W. Sales

[57] ABSTRACT

An electronic mail alert system includes an e-mail server for administering an e-mail account of an e-mail service subscriber and an e-mail alert front-end. The e-mail server includes a subscriber account memory for storing an indication that e-mail has been received by the e-mail server for an e-mail alert service subscriber as well as a communication port for allowing the e-mail alert service subscriber to retrieve e-mail from the e-mail server via a subscriber terminal remote from the e-mail server. The e-mail alert front-end is coupled to the e-mail server and polls the e-mail server periodically to determine whether e-mail for the e-mail alert service subscriber has been received by the e-mail server. The front-end is also coupled to a satellite transmitter so that an e-mail notification can be disseminated, via a continuous, high-speed communication channel, for reception by the subscriber terminal to apprise the subscriber that e-mail for the e-mail alert service subscriber has been received by the e-mail server.

43 Claims, 2 Drawing Sheets

ELECTRONIC MAIL NOTIFICATION SYSTEM AND METHOD WITHIN A HYBRID NETWORK THAT TRANSMITS NOTIFICATIONS VIA A CONTINUOUS, HIGH-SPEED CHANNEL

BACKGROUND OF THE INVENTION (a) Field of the Invention

The present invention relates generally to electronic mail in a network environment and, more particularly, to a hybrid network system having a one-way, continuous, high-speed (e.g., at least one megabit per second) broadcast communication channel allowing a computer server to transmit packetized data such as electronic-mail status information to one or more computer terminals and also having a switched communication channel, which may operate at a relatively lower speed, for permitting a user of the terminal to interact with the computer server. The present invention uses such a hybrid network to transmit electronic mail status information from an electronic mail server to a terminal and to allow electronic mail to be retrieved from the electronic mail server via the terminal.

(b) Description of Related Art

The use of electronic mail or Ile-mail,, as a mode of communication has proliferated in the past several years, both in the local-area network (LAN) environment and in the environment of wider-area networks, such as the internet, for example. Clearly, one important facet of any e-mail system is that e-mail recipients must be notified that they have received e-mail messages so that they know to retrieve them, read them, and, if necessary, respond to them.

In an inter-LAN e-mail system (i.e., a system for distributing e-mail from one LAN user's terminal to another), notifying the e-mail recipient is relatively straightforward, because each LAN terminal, by its nature, is continuously connected to the local area network so that a notification can be sent to the LAN terminal (or an e-mail message can be retrieved by the LAN terminal) at any time. Accordingly, various systems have been provided for m handling e-mail notifications in the LAN environment. For example, an audible or visual notification can be provided at a LAN terminal or workstation being used by the e-mail recipient. If the e-mail recipient is not logged on to the LAN when the e-mail message is sent, the notification is typically stored in a buffer and is presented to the recipient when she next logs on. Because the LAN connection is continuous, only minimal overhead costs are incurred in providing a transmission path for e-mail notifications.

Notifying an e-mail recipient that she has received e-mail is more problematic, however, in a broader network, such as the internet, where the connection between the terminal or workstation used by the e-mail recipient and the physical network is often a switched connection, such as a dial-up modem connection or an ISDN connection, rather than a continuous connection. Conventionally, an e-mail service subscriber must periodically access the network via a dial-up or other switched connection and must enter a subscriber identifier and a password to be informed of awaiting e-mail messages and then to retrieve any such messages via the dialup connection. Prior to accessing the network in this manner, the subscriber does not know whether any e-mail has been sent to him, and could go through this dial-up process numerous times before actually receiving an e-mail message.

To simplify the task for e-mail subscribers, the dial-up process has been automated to some extent, such as by providing subscriber hardware for automatically dialing in to a network or e-mail server periodically; automatically entering the subscriber identifier and password; and automatically checking for e-mail messages for a subscriber; and possibly also for automatically downloading the e-mail messages for the subscriber.

Nonetheless, each of these prior-art systems requires repeated access to a telephonic or other switched connection to the network or e-mail server and requires active processing by the terminal or workstation of the e-mail subscriber before the notification is received by the subscriber. Moreover, connection to the network via telephone may require long-distance telephone calls which can be expensive for users. Further, such repeated telephone access requires excessive use of finite telephone network resources as well as users' valuable telephone lines and thus potentially prevents the users from receiving incoming telephone calls.

One prior-art solution has been to send e-mail notifications to e-mail subscribers via wireless pagers using a low-speed, unidirectional, terrestrial broadcast. The obvious shortcomings of this system are that a user must incur the cost and inconvenience of carrying a pager to receive notifications, and that the e-mail service must employ a terrestrial (e.g., cellular) communication facility to transmit e-mail notifications, which adds significantly to the overhead costs of the e-mail service. Moreover, the pager notifications are not integrated with the computer network, and notifications therefore cannot be transmitted directly to subscribers' computer terminals.

Some hybrid computer network systems have been developed, but those systems do not provide functionality for e-mail notification and e-mail message transmission. In that respect, previously developed hybrid computer network systems operate like conventional network systems, employing only low-speed, switched communication channels for on-request e-mail message retrieval.

SUMMARY OF THE INVENTION

To overcome the foregoing disadvantages of prior-art e-mail notification systems, the present invention provides an e-mail alert system and method that notifies an e-mail subscriber, via a high-speed, continuous communication channel, when an e-mail server has received an e-mail message for the subscriber. More particularly, the present invention takes advantage of the capabilities of hybrid computer networks, which have both a continuous, high-speed communication capability (using a satellite link or a one- or two-way cable connection, for example) and a second communication capability, such as a switched, generally lower-speed communication capability (using a dial-up modem connection, for example). Of course, many alternative bidirectional communication schemes employed by hybrid computer networks also support the present invention. A two-way cable system having a switched return channel by which a terminal must request resource information (such as an Internet Protocol address) is only one example. Another feature of most hybrid computer networks that the present invention advantageously employs is the capability of the continuous communication channel to broadcast a bitstream of data packets to multiple computer terminals simultaneously.

The present invention is particularly useful because it employs this hybrid inter-computer communication to improve upon existing electronic mail services. As will be explained in more detail below, the present invention can be readily integrated with many existing e-mail systems with little or no modification of such systems and provides e-mail notifications directly to the computer terminals of e-mail alert service subscribers. In contrast, the prior-art, pager-based notification system described above is wholly separate from the underlying e-mail system, and the users of the prior-art system receive notifications on an electronic pager via a one-way, low-speed communication channel, rather than via a continuous, high-speed communication channel coupled directly to the same computer terminal with which users can retrieve actual e-mail messages.

According to one aspect of the present invention, an e-mail alert system having an e-mail server for administering an e-mail account of an e-mail service subscriber includes an e-mail alert front-end computer.

Of course, as will be evident to those of ordinary skill in the art, the front-end computer can be replaced by an equivalent computer program running on the e-mail server and having the same functionality as the hardware-implemented front-end computer described herein. Therefore, when used by itself herein, the term "front-end" generically encompasses not only front-end computers (i.e., hardware together with any associated software) but also equivalent software-only implementations of front-end computer functionality.

The e-mail server includes a subscriber account memory for storing an indication that e-mail has been received by the server for the service subscriber and communicating means for allowing the service subscriber to retrieve e-mail from the server via a subscriber terminal remote from the server using either a switched, low-speed communication channel, or a continuous, high-speed communication channel. Of course, the subscriber account memory may also be used to store e-mail messages for e-mail service subscribers, or a separate memory may be used for this purpose, if desired.

The e-mail alert front-end computer, or a computer program equivalent thereto, includes polling means, such as an ethernet interface card providing a LAN connection to the e-mail server, for example, for polling the server to determine whether e-mail for the service subscriber has been received by the server. Preferably, the polling means polls the server periodically. In addition, the front-end includes notifying means responsive to the polling means for disseminating, via a continuous, high-speed communication channel, an electronic mail notification for the alert service-subscriber.

In one embodiment the subscriber account memory of the e-mail server contains, for each e-mail service subscriber, a time-stamp indicating a time when e-mail for the service subscriber was most recently received by the e-mail server. Ordinarily, the e-mail notification that the front-end sends to a subscriber terminal for a particular e-mail service subscriber comprises a copy of the time-stamp for that e-mail service subscriber, which time-stamp the front-end obtains from the subscriber account memory of the e-mail server. As explained in more detail below, such a notification (i.e., one comprising a copy of the time-stamp) provides the subscriber terminal with an indication of whether e-mail for the e-mail service subscriber has been received by the e-mail server. Alternatively, the e-mail notification can comprise an indication to the e-mail service subscriber that his e-mail account is full (i.e., a warning that additional, subsequently received e-mail may be discarded until the e-mail messages stored for the account have been retrieved and deleted by the subscriber).

As also explained below, however, the e-mail notification can additionally or alternatively provide an e-mail alert service subscriber with information other than an indication that e-mail for the e-mail alert service subscriber has been received by the e-mail server. For example, according to one aspect of the invention, the subscriber account memory may contain a predefined password for an e-mail alert service subscriber (as an e-mail service subscriber). When polling the e-mail server, the polling means may provide the e-mail server with an access password for the e-mail alert service subscriber. If the access password differs from the predefined password such that the e-mail server will not inform the front-end of whether e-mail for the e-mail alert service subscriber has been received by the e-mail server, then the e-mail notification may be used to provide the e-mail alert service subscriber with an indication to that effect. Moreover, the e-mail notification may also be used to indicate to an e-mail alert service subscriber that his e-mail alert account is "blocked" or disabled for administrative reasons, such as if the e-mail alert service subscriber is not current in paying for the e-mail alert service. In other words, an e-mail account is said to be blocked when the e-mail alert system simply will not provide the e-mail alert service subscriber with e-mail notifications. Still further, the e-mail notification may be used to provide an e-mail alert service subscriber with an indication that the e-mail server is not operational and thus that the front-end cannot determine whether e-mail for the e-mail alert service subscriber has been received by the e-mail server.

In other embodiments of the invention, instead of representing a time when e-mail for an e-mail service subscriber is received by the e-mail server, the time-stamp may alternatively be assigned a value that uniquely identifies a particular e-mail message received by the e-mail server for an e-mail service subscriber. In general, it is preferable that the time-stamp be assigned a value that changes each time an e-mail message is received and which is not likely to repeat as multiple e-mail messages are received. However, the time-stamp could alternatively be a repeatable value, such as a binary (e.g., one or zero) indication of whether or not e-mail for an e-mail service subscriber has been received by the e-mail server. Of course, any other suitable time-stamp format may alternatively be used, if desired.

According to another aspect of the invention, the subscriber terminal may include receiving means for receiving the e-mail notification from the front-end and determining means for determining what the e-mail notification indicates, and may further include informing means responsive to the determining means for informing the service subscriber of what the e-mail notification indicates.

Preferably, the time-stamp stored in the subscriber account memory of the e-mail server is updated each time e-mail for the e-mail service subscriber is received by the e-mail server, and the polling means of the front-end polls the e-mail server periodically to obtain the time-stamp for the e-mail service subscriber.

The subscriber terminal preferably includes a time-stamp memory for storing a latest time-stamp which the subscriber terminal most recently received from the front-end for the e-mail alert service subscriber. Such a subscriber terminal may also include comparing means for comparing a time-stamp received from the front-end with the latest time-stamp stored in the time-stamp memory and for providing to the e-mail alert service subscriber an indication that e-mail for the e-mail alert service subscriber has been received by the e-mail server if the received time-stamp differs from the latest time-stamp.

According to another aspect of the present invention, the subscriber terminal may include retrieving means for retrieving e-mail from the e-mail server, and the retrieving means may retrieve e-mail from the e-mail server either via a switched, low-speed communication channel or via a continuous, high-speed communication channel.

In one embodiment, the subscriber account is an internet-accessible post office protocol 3 (i.e., POP-3) e-mail account. The subscriber terminal may be a stand-alone personal computer or may be a local area network e-mail server, or any other part of a computer network. Further, as noted above, the front-end may be a suitably programmed computer located either at the same site as, or remotely from, the e-mail server, or it may be an equivalent computer program running on the e-mail server itself.

According to yet another aspect of the present invention, the front-end further includes encryption means for encrypting the e-mail notification sent to the subscriber terminal by the notifying means.

Hughes Network Systems' DirecPC® system provides an exemplary hybrid network system platform for the present invention. Preferably, a dial-up modem is used as the switched communication channel; a Sun Sparcstation running Software.com's "Post Office" e-mail server software is used as the e-mail server, operating remotely at a network operations center; a separate Microsoft Windows NT personal computer is used as the e-mail alert front-end; an application running on the DirecPC® terminal is used as the notification means; and Netscape Navigator running on the DirecPC® terminal is used to retrieve e-mail messages from the e-mail server.

The present invention alternatively comprises a method of notifying a subscriber of an e-mail service including an e-mail server having a subscriber account memory and being accessible by the subscriber via a subscriber terminal remote from the e-mail server, as well as an e-mail alert front-end adapted for communicating with the e-mail server. The method includes the steps of maintaining, at the subscriber terminal, a latest time-stamp indicating when the e-mail server most recently received e-mail for the subscriber; storing, in the subscriber account memory of the e-mail server, an updated time-stamp associated with the subscriber, wherein the updated time-stamp indicates a time when e-mail for the subscriber is received by the e-mail server; providing for the front-end to periodically poll the e-mail server to obtain the updated time-stamp associated with the subscriber and to send the updated time-stamp to the subscriber terminal via a continuous, high-speed communication channel; and providing for the subscriber terminal to compare the updated time-stamp to the latest time-stamp and to provide an indication to the subscriber that e-mail for the subscriber has been received by the e-mail server if the updated time-stamp differs from the latest time-stamp.

DESCRIPTION OF THE PREFERRED EMBODIMENTS

Figure 1:
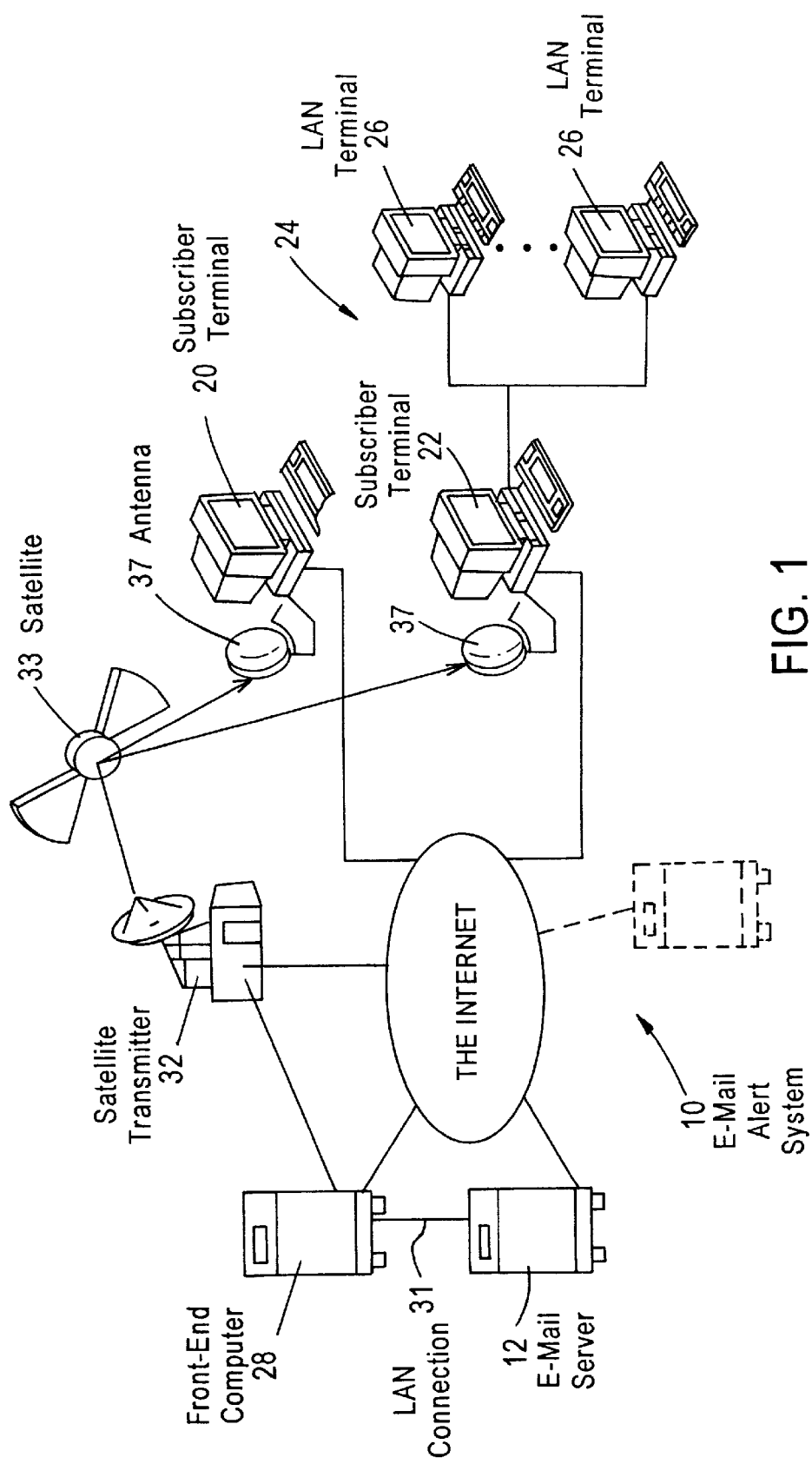
FIG. 1 is a diagrammatic view of an e-mail system including a notification system according to the present invention.
Figure 2:
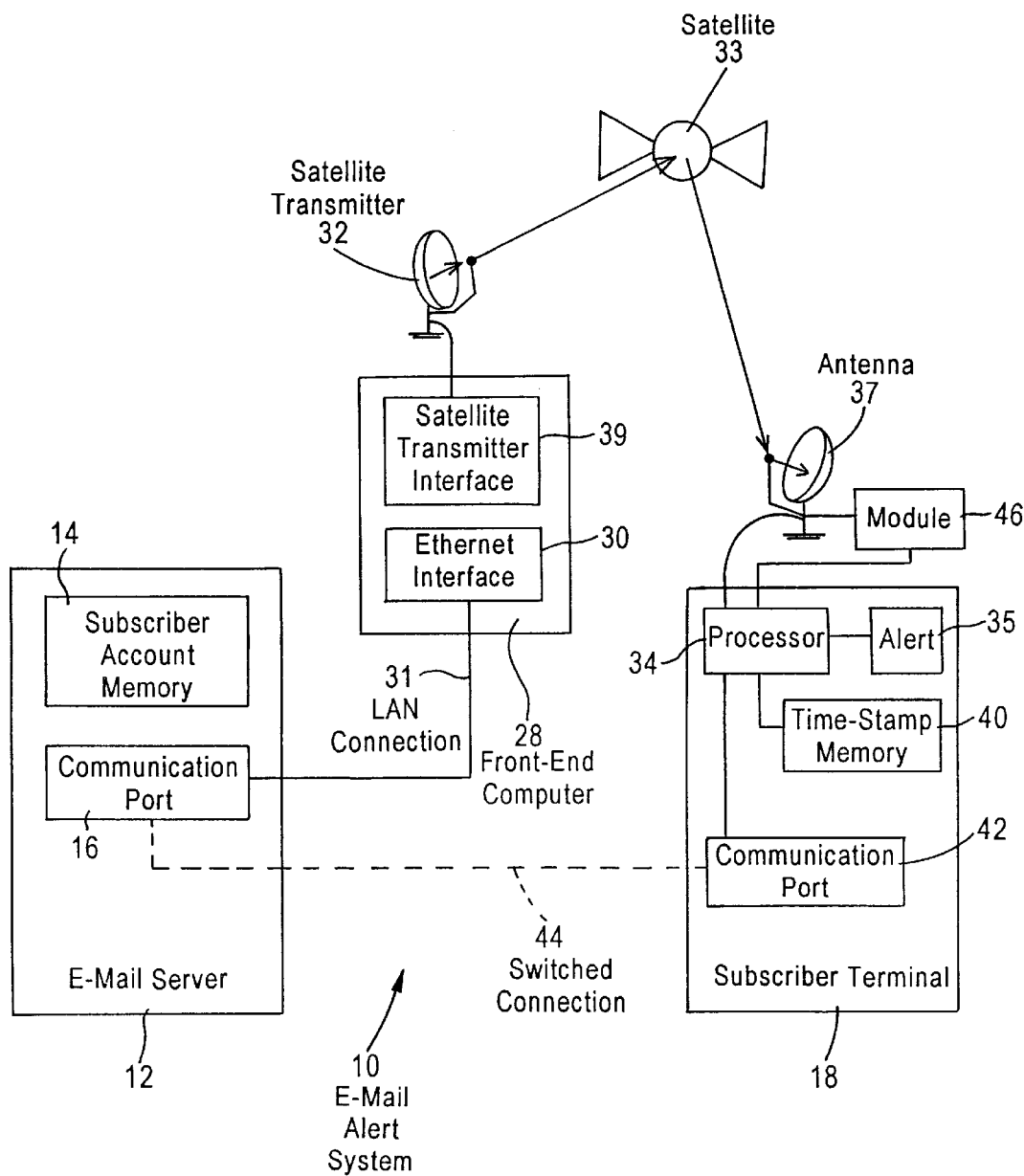
FIG. 2 is a schematic block diagram of the e-mail system of FIG. 1 illustrating some of the components thereof in greater detail.

As shown in FIG. 1, an e-mail system 10 includes an e-mail server 12 for administering e-mail accounts of subscribers to an e-mail service. As shown in FIG. 2, the server 12 includes a subscriber account memory 14 which is used to maintain information about e-mail accounts of the various subscribers to the e-mail service. For example, when the e-mail server 12 receives e-mail for an e-mail service subscriber, the subscriber account memory 14 stores an indication that such e-mail has been received for the e-mail service subscriber, as well as storing the e-mail message itself. The indication may comprise a time-stamp indicating the time when the e-mail was received by the e-mail server for the e-mail service subscriber. The e-mail server 12 also includes a communication port 16 or other suitable communicating means for allowing the e-mail service subscriber to retrieve e-mail from the e-mail server 12 via a subscriber terminal 18 which generally is located remotely from the e-mail server 12.

As illustrated in FIG. 1, the subscriber terminal 18 may either be a stand-alone personal computer 20 or may be a network e-mail server 22 (a different server than the e-mail server 12). In the latter, network environment (i.e., where the subscriber terminal 18 is a network e-mail server 22 and is part of a local area network (LAN) 24), the subscriber terminal 22 may receive e-mail notifications on behalf of e-mail alert service subscribers using LAN client terminals 26, as well as on behalf of a subscriber using the subscriber terminal 22.

In accordance with the present invention, the e-mail system 10 includes an e-mail alert front-end computer 28 (FIGS. 1 and 2) or a functionally equivalent software-implemented front-end 28. The front-end computer 28 may be located at the same site as the e-mail server 12 or may be located remotely therefrom. In any case, the front-end computer 28 includes an ethernet interface 30 providing a LAN connection 31 to the communication port 16 of the e-mail server 12, or any other suitable polling means for polling the e-mail server 12 to determine whether e-mail for an e-mail alert service subscriber has been received by the e-mail server 12. The front-end computer 28 also includes a satellite transmitter 39 or any other suitable notifying means responsive to the ethernet interface 30 for disseminating an e-mail notification for an e-mail alert service subscribers via a continuous, high-speed communication channel (e.g., via satellite or via a cable connection), indicating that e-mail for the e-mail alert service subscriber has been received by the server 12. More particularly, e-mail notifications are transmitted by a satellite transmitter 32 in an uplink signal to a satellite 33 (FIG. 1) and are reflected or retransmitted by the satellite 33 in a downlink signal to subscriber terminals 18 (such as terminals 20 and 22 of FIG. 1) which have satellite signal receiving antennas 37 for receiving the downlink signal. Of course, if desired, the e-mail notifications may be conventionally multiplexed together with data to be transmitted via the high-speed communication channel from other sources, such as from the computer shown in phantom lines in FIG. 1, for example. In addition, the low-speed and high-speed communication channels of a hybrid network in which the present invention is employed can be used in many different ways. In one exemplary embodiment, the high-speed communication channel can be used for the sole purpose of broadcasting information to users (e.g., for sending e-mail notifications to e-mail alert service subscribers as a group). In another embodiment, the high-speed communication channel can also be employed in conjunction with the low-speed communication channel for interactive communication (e.g., for sending to a user, at high speed, data that the user specifically requested via the low-speed channel).

Typically, the e-mail server 12 administers e-mail accounts, such as internet-accessible post-office-protocol 3 (POP-3) e-mail accounts, for example, for a plurality of subscribers to an e-mail service. These individuals are referred to herein as e-mail service subscribers. Some or all of the e-mail service subscribers may additionally subscribe to an e-mail alert service in accordance with the present invention. The e-mail alert service may simply be an optional feature of the e-mail service, or it may be an entirely separate service offered by a different service provider. The sub-group of e-mail service subscribers also subscribing to the e-mail alert service is referred to herein as e-mail alert service subscribers. Naturally, care should be taken to distinguish between e-mail service subscribers and e-mail alert service subscribers.

The subscriber account memory 14 of the e-mail server 12 contains a time-stamp associated with each e-mail alert service subscriber. The time-stamp associated with any given e-mail alert service subscriber may represent the status of the subscriber's e-mail account in various ways. Most commonly, it is an indication of an actual time (and optionally an actual date, if desired) when the server 12 most recently received an e-mail message for the given e-mail alert service subscriber. Alternatively, a time-stamp may be a number, such as a version number, that uniquely identifies a particular e-mail message received by the e-mail server 12 for the given e-mail alert service subscriber, or it may be a binary indication of whether or not e-mail for the given e-mail alert service subscriber has been received by the e-mail server 12 at any given time.

When the front-end computer 28 polls the e-mail server 12 on behalf of one or more e-mail alert service subscribers as described above, it obtains from the e-mail server 12, for each e-mail alert service subscriber, an indication, such as the time-stamp stored in the subscriber account memory 14, of whether e-mail has been received by the e-mail server 12 for the one or more e-mail alert service subscribers. Thereafter, the notifying means 39 of the front-end computer 28 disseminates an e-mail notification for each e-mail alert service subscriber by sending each e-mail notification to a subscriber terminal 20 or 22 for an e-mail alert service subscriber.

The e-mail notification sent to an e-mail alert service subscriber may either comprise the very same indication that the front-end computer 28 obtained from the e-mail server 12, or may instead comprise a copy of that indication which is first modified by the front-end computer 28 and is then sent, as modified, to the subscriber terminal 18. For example, the time-stamps stored in the subscriber account memory 14 of the e-mail server 12 may be numerical time/date values as noted above, but the e-mail notification sent to a subscriber terminal 20 or 22 by the front-end computer 28 may be a binary indication as described above.

Alternatively, in developing the e-mail notification to send to an e-mail alert service subscriber, the front-end computer 28 may modify the indication obtained from the subscriber account memory 14 of the e-mail server 12 to provide information to the e-mail alert service subscriber other than, or in addition to, the time when e-mail for the e-mail alert service subscriber was most recently received by the e-mail server 12. For example, the e-mail notification may be a special value that indicates to the subscriber terminal 20 or 22 that the e-mail server 12 is not operational and thus that the front-end computer 28 cannot determine whether e-mail for the e-mail alert service subscriber has been received by the e-mail server 12.

Additionally, the e-mail server 12 conventionally maintains a predefined password for. each e-mail service subscriber. When polling the e-mail server 12 for information about e-mail of an e-mail service subscriber (who is also an e-mail alert service subscriber), the front-end computer 28 provides the e-mail server 12 with an access password for the e-mail service subscriber's e-mail account. If the provided access password differs from the predefined password stored by the e-mail server 12 for that e-mail service subscriber, the front-end computer 28 is unable to receive a time-stamp or other indication from the e-mail server 12. In such a case, the e-mail notification sent to the subscriber terminal 20 or 22 may be assigned another special value that signifies to the subscriber terminal 20 or 22 that the password entered for the e-mail service subscriber is not valid and thus that the front-end computer 28 cannot determine whether e-mail for the e-mail alert service subscriber has been received by the e-mail server 12.

Another special e-mail notification value may be used to inform an e-mail alert service subscriber that the e-mail alert system 10 will not provide him with e-mail notifications for administrative reasons, such as because his subscription to the e-mail alert service is expired, or because his payment for the e-mail alert service subscription is overdue.

Of course, in embodiments where the e-mail notification may be assigned special values such as those described above, the subscriber terminal 18 (FIG. 2) must include a memory or other suitable means for receiving the e-mail notification from the front-end computer 28 and a processor 34 or other suitable means for determining what the e-mail notification indicates. The subscriber terminal 18 should further include an audible or visual alert 35 or other suitable means responsive to the processor 34 for informing the e-mail alert service subscriber of what the e-mail notification indicates.

In operation, the e-mail server 12 updates the time-stamp memory 14 for an e-mail service subscriber each time the e-mail server 12 receives e-mail for the e-mail service subscriber, and the polling means 30 of the front-end computer 28 polls the e-mail server 12 to obtain an e-mail notification for each e-mail alert service subscriber. The front-end computer 28 sends the e-mail notifications using conventional multi-cast data packets addressed to be receivable by each of the e-mail alert service subscribers. It will be readily apparent to those skilled in the art, however, that the present invention contemplates the use of any other suitable format for continuous, high-speed transmission of e-mail notifications and/or other information. One such other format is a data packet individually addressed to an e-mail alert service subscriber. Another example is a broadcast data packet sent to all terminals but containing an identifier signaling to subscriber terminals that the broadcast data packet contains e-mail alert information. Still another example is interactive communication, wherein requests for information, such as e-mail messages, are sent into the network via the switched communication channel and responses are returned at high speed via the continuous broadcast channel. In addition, the front-end computer 28 ordinarily is configured to poll the e-mail server 12 periodically. However, any other desired polling frequency or even an irregular polling schedule may be implemented instead. Further, because some e-mail alert service subscribers may need or want to receive e-mail notifications more or less quickly than others, the font-end computer 28 can be adapted to poll the e-mail server 12 and send e-mail notifications at a different frequency for each e-mail alert service subscriber, if desired.

As illustrated by FIG. 2, the subscriber terminal 18 determines, based on each e-mail notification it receives from the front-end computer 28, whether e-mail for a subscriber has been received by the e-mail server 12. To do so, the subscriber terminal 18 includes a time-stamp memory 40 for storing a "latest" time-stamp which the subscriber terminal 18 most recently received in an e-mail notification from the front-end computer 28 for the e-mail alert service subscriber. The comparison of the time-stamp received from the e-mail server 12 with the most recently received or "latest" time-stamp stored in the time-stamp memory 40 of the subscriber terminal 18 is then made by the processor 34 or other suitable comparing means provided at the subscriber terminal 18.

If the received time-stamp differs from the latest time-stamp stored in the time-stamp memory 40, then the alert 35 provides the e-mail alert service subscriber with an audible and/or visual indication that e-mail for the e-mail alert service subscriber has been received by the e-mail server 12. For example, a blinking icon may appear on a display screen (not shown) of the subscriber terminal 18 until a user acknowledges having seen the e-mail notification (e.g., by clicking the blinking icon with a mouse (not shown)). Moreover, the subscriber terminal 18 optionally can be suitably programmed to automatically dial in to the e-mail server 12 and retrieve e-mail messages for an e-mail alert service subscriber whenever the subscriber terminal 18 detects that the received time-stamp differs from the stored latest time10 stamp.

It should be noted that while the description herein is focused on the functionality of the present invention being provided by an e-mail alert service subscriber's subscriber terminal 18, any or all of that functionality can alternatively be provided by a module 46 .(FIG. 2) which operates independently of, but is cooperable with, the subscriber terminal 18. Thus, the module 46 can receive e-mail notifications via the antenna 37 and provide audible and/or visual indications to an e-mail alert service subscriber when e-mail for that subscriber has been received by the e-mail server 12.

Each subscriber terminal 18 includes a communication port 42 or other suitable means for retrieving e-mail from the e-mail server 12. More particularly, e-mail may be downloaded via a link 44 (shown in phantom in FIG. 2) interconnecting the communication port 16 of the e-mail server 12 with the communication port 42 of the subscriber terminal 18. Ordinarily, the link 44 is a terrestrial connection, such as a dial-up connection, but it can alternatively be a satellite connection wherein e-mail is transmitted from the e-mail server 12 to the subscriber terminal 18 by means of a satellite transmitter associated with the e-mail server 12, or a packet-based networking connection, or it can be any other type of high- or low-speed downloading connection. Further, a subscriber can request e-mail via a low-speed connection, and the e-mail can be sent to the subscriber via a high-speed connection. Significantly, this flexibility in the manner in which an e-mail service subscriber can retrieve e-mail from the e-mail server 12 advantageously permits the present invention to be integrated directly with conventional, presently existing e-mail systems without any major additional expense or modification thereto.

Conventional e-mail systems often provide means for encrypting e-mail messages to protect the privacy of the senders and recipients of such messages. Correspondingly, the front-end computer 28 may include a similar encoder or other conventional encrypting means for encrypting the e-mail notifications sent to subscriber terminals 18 by the notifying means 39 of the front-end computer 28. Such encryption prevents unauthorized persons (i.e., persons other than the sender and the recipient of an e-mail message), who may intercept the e-mail notification, from discovering who is receiving e-mail and when.

More particularly, when a subscriber initially subscribes to an e-mail alert service according to the present invention, the front-end computer 28 generates a respective secret key for the subscriber which is used to encrypt e-mail notifications for the subscriber as described in more detail below. The secret key for each e-mail alert service subscriber is provided exclusively to the respective subscriber so that only that subscriber can decrypt the e-mail notifications that relate to e-mail for his e-mail account. The front-end computer 28 maintains a record of e-mail alert service subscribers, their respective account names, and their respective secret keys.

The front-end computer 28 of an e-mail alert service uses the high-speed communication channel to periodically transmit a multi-cast data packet having a header that contains a predetermined multi-cast address recognized by the subscriber terminal 18 of every subscriber to the e-mail alert service. The multi-cast data packet contains an e-mail notification for each subscriber to the e-mail alert service. Upon receiving a data packet bearing the predetermined multi-cast address, the subscriber terminal 18 of each e-mail alert service subscriber parses the multi-cast data packet, using the secret key assigned to the e-mail alert service subscriber, to identify the e-mail notification intended for the e-mail alert service subscriber then using the subscriber terminal 18.

More particularly, the multi-cast data packet contains a value that changes frequently (e.g., the time at which the multi-cast data packet is transmitted). Also, for each subscriber to the e-mail alert service, the multi-cast data packet further contains a time-stamp and a corresponding message authentication code (MAC). The MAC for each e-mail alert service subscriber is the hash value generated by any predetermined, conventional hashing function, which converts the e-mail alert service subscriber's account name, the frequently changing value, and the secret key assigned to the e-mail alert service subscriber into an n-bit number or MAC (of preferably about forty bits).

Each subscriber terminal 18 extracts the appropriate time-stamp from the multi-cast data packet by computing a MAC value for each successive time-stamp in the multi-cast data packet until a MAC value is computed which is identical to the MAC value appearing together with the time-stamp in the multi-cast data packet. Specifically, the subscriber terminal 18 of an e-mail alert service subscriber applies the predetermined conventional hashing function to the e-mail alert service subscriber's account name, the frequently changing value appearing in the multi-cast data packet, and a time-stamp appearing in the multi-cast data packet to produce a computed MAC value. The subscriber terminal 18 then compares the computed MAC value to the MAC value corresponding to the time-stamp used by the subscriber terminal 18 to produce the computed MAC value. When the subscriber terminal 18 detects that the two compared MAC values are identical, the subscriber terminal 18 ceases examining the remaining time-stamps and MAC values in the multi-cast data packet. The time-stamp having a corresponding MAC value identical to the computed MAC value is the time-stamp for the e-mail alert service subscriber. Having thus extracted the time-stamp or other e-mail notification for the e-mail alert service subscriber from the multi-cast data packet, the subscriber terminal 18 can then determine whether the time-stamp has changed and thus whether the e-mail alert service subscriber has received e-mail in accordance with the present invention.

The number of bits in the MAC transmitted for each e-mail alert service subscriber should be large enough to ensure that the MAC value can be used as a fingerprint for the correct combination of account name, hash value, and time-stamp (in accordance with well-known principles of hashing). Subject to that constraint, however, it is desirable to minimize the number of bits used for the MAC because a per-bit overhead cost is associated with use of the high-speed communication channel of the hybrid network system to transmit the multi-cast data packets. Nonetheless, providing e-mail notifications via the high-speed communication channel of an existing hybrid network system (such as Hughes Network Systems' DirecPC® system) according to the present invention is quite inexpensive.

While the present invention has been described herein with reference to specific examples, those examples are intended to be illustrative only, and are not to be deemed to limit the scope of the invention. To the contrary, it will be apparent to those of ordinary skill in the art that many changes, additions and/or deletions may be made to the disclosed embodiments without departing from the scope and spirit of the invention.

What is claimed is:

1. An electronic mail front-end for an electronic mail alert system, the electronic mail alert system having an electronic mail server which administers a subscriber electronic mail account and stores electronic mail previously sent to the server from a remote terminal, wherein the electronic mail server includes a subscriber account memory for storing an indication that electronic mail has been received by the server for a service subscriber, and communicating means for allowing a subscriber terminal to retrieve electronic mail from the server, the electronic mail front-end comprising:

polling means for polling the server to determine whether the server has received electronic mail for the service subscriber, the electronic mail having been sent to the electronic mail server from a remote terminal; and notifying means responsive to the polling means for disseminating an electronic mail notification to the subscriber terminal, via a high-speed, continuous communication channel, the subscriber terminal being one of a stand-alone personal computer, a personal computer connected to a computer network, and a local area network electronic mail server, and the high-speed, continuous communication channel being one of a satellite link and a cable connection, the subscriber terminal further being connected to the electronic mail server of the electronic mail alert system via a dial-up connection to request previously notified electronic mail, such that the same subscriber terminal is provided with both a high-speed, continuous communication channel for receiving electronic mail notification and a dial-up connection for requesting previously notified electronic mail.

2. The electronic mail front-end of claim 1, wherein the electronic mail notification comprises an indication that electronic mail for the service subscriber has been received by the server.

3. The electronic mail front-end of claim 1, wherein the subscriber account memory of the server additionally stores electronic mail received by the server for the service subscriber.

4. The electronic mail front-end of claim 1, in combination with a subscriber terminal, wherein the subscriber terminal includes retrieving means for retrieving electronic mail from the server.

5. The electronic mail front-end of claim 4, wherein the communicating means comprises a high-speed, continuous communication channel between the server and the retrieving means of the subscriber terminal.

6. The electronic mail front-end of claim 5, wherein the electronic mail notification comprises part of a packet-carrying bitstream sent from the electronic mail alert front-end to a plurality of subscriber terminals.

7. The electronic mail front-end of claim 5, wherein the high-speed, continuous communication channel comprises a satellite link.

8. The electronic mail front-end of claim 5, wherein the high-speed, continuous communication channel comprises a cable-modem coupled to the server and a cable connection coupled between the cable modem and the subscriber terminal.

9. The electronic mail front-end of claim 4, wherein the communicating means comprises a switched, low-speed communication channel between the server and the retrieving means of the subscriber terminal.

10. The electronic mail front-end of claim 9, wherein the low-speed communication channel comprises a dial-up connection between the server and the retrieving means of the subscriber terminal.

11. The electronic mail front-end of claim 9, wherein the subscriber terminal includes requesting means for requesting information via the low-speed, switched communication channel and wherein the electronic mail server includes sending means responsive to a request from a subscriber terminal for sending requested information to the subscriber terminal via the high-speed, continuous communication channel.

12. The electronic mail front-end of claim 1, wherein the polling means of the front-end polls the server periodically.

13. The electronic mail front-end of claim 1, wherein the notifying means sends the electronic mail notification for the service subscriber to the subscriber terminal.

14. The electronic mail front-end of claim 1, wherein the electronic mail notification indicates that the server is not operational and thus that the front-end cannot determine whether electronic mail for the service subscriber has been received by the server.

15. The electronic mail front-end of claim 1, wherein the subscriber account memory of the server contains a time-stamp for the service subscriber.

16. The electronic mail front-end of claim 15, wherein the time-stamp indicates a time when electronic mail for the service subscriber was most recently received by the server.

17. The electronic mail front-end of claim 15, wherein the time-stamp is a number that uniquely identifies a particular electronic mail message received by the server for the service subscriber.

18. The electronic mail front-end of claim 15, wherein the subscriber account memory of the server contains a predefined password for the service subscriber.

19. The electronic mail front-end of claim 18, wherein the polling means of the front-end provides the server with an access password for the service subscriber, and wherein the electronic mail notification comprises the time-stamp for the service subscriber if the access password and the predefined password are identical and otherwise comprises an indication that the access password differs from the predefined password and thus that the front-end cannot determine whether electronic mail for the service subscriber has been received by the server.

20. The electronic mail front-end of claim 15, wherein the subscriber terminal includes receiving means for receiving the time-stamp from the front-end and determining means for determining what the time-stamp indicates.

21. The electronic mail front-end of claim 20, wherein the subscriber terminal further includes informing means responsive to the determining means for informing the service subscriber of what the time-stamp indicates.

22. The electronic mail front-end of claim 15, wherein the time-stamp is updated each time electronic mail for the service subscriber is received by the server, and wherein the polling means of the front-end polls the server periodically to obtain the time-stamp for the service subscriber.

23. The electronic mail front-end of claim 22, wherein the subscriber terminal includes a time-stamp memory for storing a latest time-stamp which the subscriber terminal most recently received from the front-end for the service subscriber.

24. The electronic mail front-end of claim 23, wherein the subscriber terminal includes comparing means for comparing a time-stamp received from the front-end with the latest time-stamp stored in the time-stamp memory and for providing to the service subscriber an indication that electronic mail for the service subscriber has been received by the server if the time-stamp differs from the latest time-stamp.

25. The electronic mail front-end of claim 1, wherein the electronic mail notification comprises an indication that the front-end will not provide the service subscriber with electronic mail notifications.

26. The electronic mail front-end of claim 1, wherein the subscriber account is an internet-accessible post office protocol 3 (POP-3) electronic mail account.

27. The electronic mail front-end of claim 1, wherein the subscriber terminal is a stand-alone personal computer.

28. The electronic mail front-end of claim 1, wherein the subscriber terminal is part of a computer network.

29. The electronic mail front-end of claim 1, wherein the subscriber terminal is a local area network e-mail server.

30. The electronic mail front-end of claim 1, wherein the front-end is located remotely from the server.

31. The electronic mail front-end of claim 1, wherein the front-end is a computer program running on the server.

32. The electronic mail front-end of claim 1, further including encryption means for encrypting the electronic mail notification disseminated by the notifying means.

33. An electronic mail alert system, comprising:
an electronic mail server for administering electronic mail for a plurality of electronic mail service subscribers and storing electronic mail which was previously sent to the server from a remote terminal, the electronic mail server including
a subscriber account memory for storing, for each subscriber, an indication that electronic mail has been received by the server for the subscriber; and
communicating means for allowing one of the subscribers to retrieve electronic mail from the electronic mail server of the electronic mail alert system via a subscriber terminal, the subscriber terminal being one of a stand-alone personal computer, a personal computer connected to a computer network, and a local area network electronic mail server, the electronic mail having previously been sent to the server from a remote terminal; and
an electronic mail alert front-end including
polling means for polling the server of the electronic mail alert system to determine whether electronic mail for at least a particular one of the subscribers has been received; and
notifying means responsive to the polling means for disseminating an electronic mail notification to the subscriber terminal, via a high-speed, continuous communication channel, the high-speed, continuous communication channel being one of a satellite link and a cable connection, the subscriber terminal further being connected to the electronic mail server of the electronic mail alert system via a dial-up connection to request previously notified electronic mail, such that the same subscriber terminal is provided with both a high-speed, continuous communication channel for receiving electronic mail notification and a dial-up connection for requesting previously notified electronic mail.

34. An electronic mail alert front-end for use with an electronic mail server that administers an electronic mail account of an electronic mail service subscriber by storing mail from the server which was previously sent from a remote terminal to the server, the electronic mail alert front-end comprising:
a communication port interconnectable with the electronic mail server for receiving an indication that the electronic mail server has received electronic mail for a service subscriber, the electronic mail having been previously sent to the electronic mail server from a remote terminal; and
a transmitter for sending the indication to a subscriber terminal via a high-speed, continuous communication channel, the subscriber terminal being one of a stand-alone personal computer, a personal computer connected to a computer network, and a local area network electronic mail server, and the high-speed, continuous communication channel being one of a satellite link and a cable connection, wherein
the subscriber terminal is connected to the electronic mail server via a dial-up connection to request previously notified electronic mail, such that the same subscriber terminal is provided with both a high-speed, continuous communication channel for receiving electronic mail notification and a dial-up connection for requesting previously notified electronic mail.

35. A method of notifying a subscriber of an electronic mail service including a server having a subscriber account memory and being accessible by the subscriber via a subscriber terminal so that the subscriber terminal may retrieve electronic mail from the server which was previously sent to the server from a remote computer terminal, the service further including an electronic mail alert front-end adapted for communicating with the server, the method comprising the steps of:
maintaining at the subscriber terminal a latest time-stamp indicating when the server most recently received electronic mail for the subscriber;
storing in the subscriber account memory of the server an updated time-stamp associated with the subscriber, wherein the updated time-stamp indicates a time when electronic mail for the subscriber is received by the server;
providing for the front-end to periodically poll the server to obtain the updated time-stamp associated with the subscriber and to send the updated time-stamp to the subscriber terminal via a high-speed, continuous communication channel, the subscriber terminal being one of a stand-alone personal computer, a personal computer connected to a computer network, and a local area network electronic mail server, and the high-speed continuous communication channel being one of a satellite link and a cable connection; and
providing for the subscriber terminal to compare the updated time-stamp to the latest time-stamp and to provide an indication to the subscriber that electronic mail for the subscriber has been received by the server of the electronic mail service if the updated time-stamp differs from the latest time-stamp, wherein the subscriber terminal is further connected to the server of the electronic mail service via a dial-up connection to request previously notified electronic mail.

36. A method of notifying an electronic mail system subscriber that the system has received electronic mail for the subscriber so that a subscriber terminal may retrieve electronic mail previously sent to the electronic mail system by a remote terminal, the method comprising the steps of:

polling the electronic mail system to obtain an indication that the electronic mail system has received electronic mail for the subscriber, the electronic mail having been previously sent to the electronic mail system from a remote terminal;

sending the indication to the subscriber terminal via a high-speed, continuous communication channel, the subscriber terminal being one of a stand-alone personal computer, a personal computer connected to a computer network, and a local area network electronic mail server, and the high-speed, continuous communication channel being one of a satellite link and a cable connection, and providing the subscriber terminal with a dial-up connection to the electronic mail system for requesting previously notified electronic mail, such that the same subscriber terminal is provided with both a high-speed, continuous communication channel for receiving electronic mail notification and a dial-up connection for requesting previously notified electronic mail.

37. The method of claim 36, wherein the indication is modified before being sent to the subscriber terminal.

38. The electronic mail front-end of claim 1, wherein the packet-switched network is the Internet, and the subscriber terminal retrieves electronic mail from the electronic mail server via the Internet.

39. The electronic mail alert system of claim 33, wherein the packet-switched network is the Internet, and the subscriber terminal retrieves electronic mail from the electronic mail server via the Internet.

40. A service subscriber terminal comprising:

a first communication means for requesting electronic mail from a remote electronic mail server which stores electronic mail received from a remote terminal, said first communication means being a dial-up connection between said service subscriber terminal and the remote electronic mail server;

a second communication means for receiving an electronic mail notification from the remote electronic mail server via a high-speed, continuous communication channel, the high-speed, continuous communication channel being one of a satellite link and a cable connection, such that the same subscriber terminal has both a dial-up connection to the remote electronic mail server for requesting previously notified electronic mail and a high-speed, continuous connection to the remote electronic mail server for receiving electronic mail notifications; and alert means for alerting the service subscriber when the subscriber terminal receives an electronic mail notification from the electronic mail server, wherein the subscriber terminal is one of a stand-alone personal computer, a personal computer connected to a computer network, and a local area network electronic mail serve.

41. The service subscriber system of claim 40, wherein the high-speed, continuous communication channel is a one-way satellite link.

42. The service subscriber system of claim 41, wherein the first communication means retrieves electronic mail from the remote electronic mail server via a switched connection.

43. The service subscriber terminal of claim 40, further comprising:

a time-stamp memory for storing a time-stamp for an electronic mail notification most recently received from the electronic mail server; and comparing means for comparing an updated time-stamp received from the electronic mail server with the time-stamp stored in the time-stamp memory, wherein the alert means alerts the service subscriber that the subscriber terminal has received an electronic mail notification when the updated time-stamp differs from the stored time-stamp.

* * * * *